2 Sheets—Sheet 1.

J. W. PERRY.
SELF-DROPPING CORN-PLANTER.

No. 188,942. Patented March 27, 1877.

WITNESSES
F. L. Ourand
P. T. Dodge.

INVENTOR
James William Perry,
By
J. H. Herron.
Attorney

N. PETERS, PHOTO-LITHOGRAPHER, WASHINGTON, D. C.

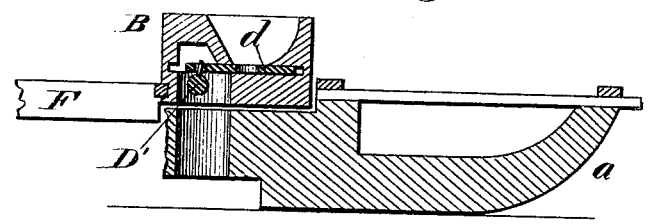

UNITED STATES PATENT OFFICE.

JAMES W. PERRY, OF KEYTESVILLE, MISSOURI.

IMPROVEMENT IN SELF-DROPPING CORN-PLANTERS.

Specification forming part of Letters Patent No. 188,942, dated March 27, 1877; application filed March 13, 1876.

*To all whom it may concern:*

Be it known that I, JAMES W. PERRY, of Keytesville, in the county of Chariton and State of Missouri, have invented certain new and useful Improvements in Corn-Planting Machines, of which the following is a specification:

My invention relates to that class of two-row corn-planting machines in which runners are hinged to the front of the frame for the purpose of opening the furrows to receive the corn, and of carrying the corn-hoppers; and the invention consists in the improved manner of arranging and operating the dropping mechanism, and in the manner of hanging the adjustable driver's seat, as well as in the other minor details hereinafter set forth.

Figure 1:
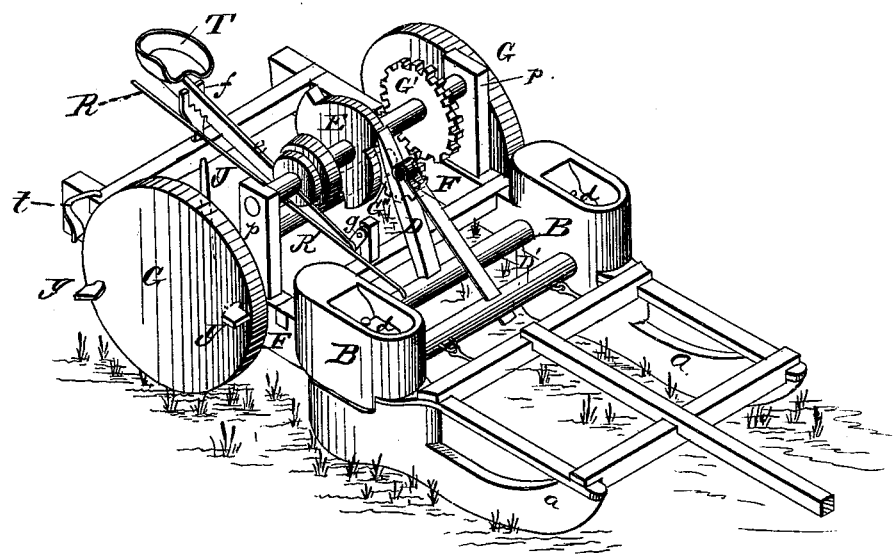
Figure 2:
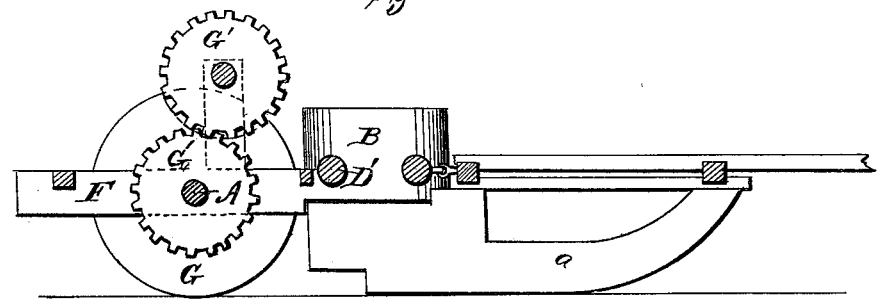

Figure 1 represents a perspective view of my machine; Fig. 2, a longitudinal central section of the same; Fig. 3, a longitudinal vertical section through the center of one of the feed-hoppers.

F represents the main frame of the machine, made in a rectangular form, and pivoted upon and sustained by a transverse rotating axle, A, the ends of which are mounted in two large driving-wheels, which latter are grooved or made concave on the periphery, and provided on the outer sides with peripheral lips $y$, which serve to enter and mark the ground at regular intervals, for the purpose of indicating the points at which the rows of corn are to be planted.

To the front corners of the main frame there are hinged two runners, $a$, connected by rigid cross-bars, as shown, and provided upon their rear ends with the seed-hoppers B.

The rear ends of the runners are provided, as usual, with vertical openings, through which the corn falls from the hoppers into the furrows opened by the runners. Each hopper has in its bottom a horizontal reciprocating slide, $d$, provided with a hole or cell through it of the proper size to receive a single charge or deposit of corn.

Above the slide there is an opening, which admits the corn from the hopper into the slide when the latter is moved forward, and below the slide there is another opening, through which the corn escapes and falls when the slide is drawn backward, as represented in Fig. 2.

The slides $d$ engage with, and are moved by, pins on the ends of a transverse rock-shaft, D', having bearings in the hoppers.

The rock-shaft is provided with, and operated by, a vibrating arm, D, which is actuated by means of a lifting-cam, E, and a depressing-spring, F, the rotation of the cam serving to raise the arm and move the feed-slides forward, and the spring serving to depress the arm and draw the slides back.

The cam is mounted on a transverse shaft provided with a pinion, G', driven by a pinion, G'', on the main shaft or axle A, as shown. This arrangement of parts, whereby the slides are driven directly from the main wheels, insures the planting of the corn at regular distances apart.

J J represent levers mounted on the frame to engage with the driving-wheels, for the purpose of controlling their rotation, and thereby enabling the operator to correct any deviation of the planting from the proper points. R represents a hand-lever attached rigidly to the rock-shaft by which the feed-slides are operated, and extending backward within convenient reach of the operator, so that by raising its ends he may hold the feed-slides out of action. T represents the driver's or operator's seat, mounted on the rear end of a bar, $e$, which has its said end notched and seated in a standard, $f$, on the frame, while its forward end is connected by a link, $g$, to a cross-bar of the main frame, as represented in the drawings. The seat thus sustained may be instantly moved forward and backward, and fastened by simply raising its rear end, moving it as required, and then seating it again in the standard, which will, of course, enter a different notch from that in which it was first seated. In this way the machine is readily balanced, and the proper amount of weight thrown upon the runners under all circumstances.

On the rear end of the frame there are secured scrapers $t$, which serve to remove all adhering earth from the surface of the main wheels.

What I claim is—

1. In a two-row corn-planting machine, the combination of the two hoppers, B, provided with the feed-slides d, the transverse rock-shaft D', provided at its ends with pins to actuate the slides, and at its middle with the rigid arm D, the depressing-spring F, and the cam-wheel E, driven from the main wheels of the machine, as shown.

2. The driver's seat T, mounted on the notched bar e, sustained at its rear end in the standard f, and connected at its front end to the frame by the link g.

In testimony that I claim the foregoing as my own invention, I affix my signature in presence of two witnesses.

JAMES WILLIAM $\overset{\text{his}}{\underset{\text{mark.}}{\times}}$ PERRY.

Witnesses:
    JOHN A. LEE,
    F. T. DYSART.